No. 651,300. Patented June 5, 1900.
M. B. CULBERTSON, Dec'd.
S. F. CULBERTSON, Administratrix.
GRAIN SEPARATOR.
(Application filed July 13, 1899.)
(No Model.)
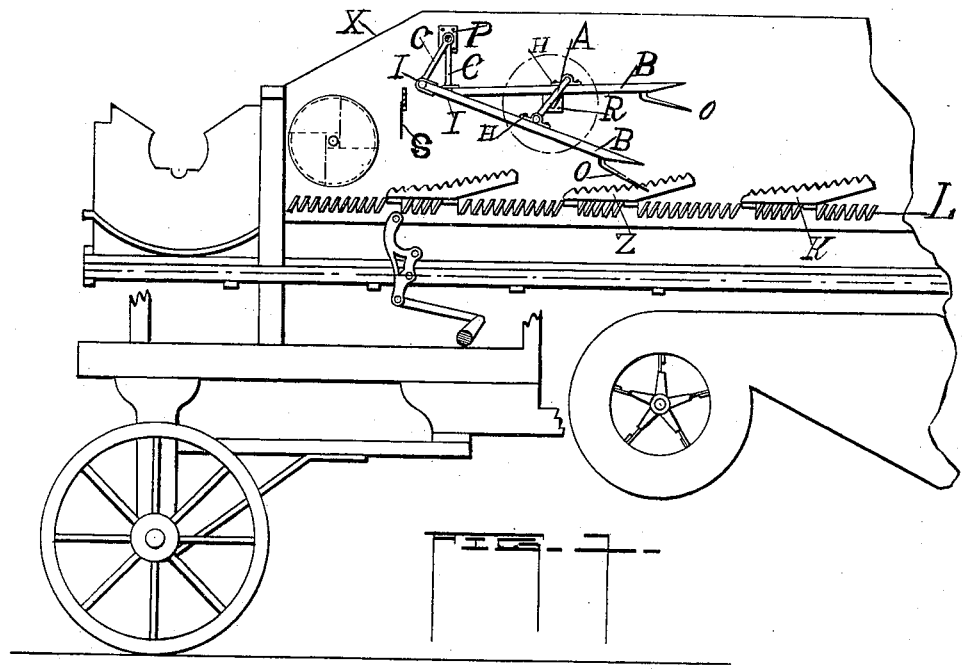
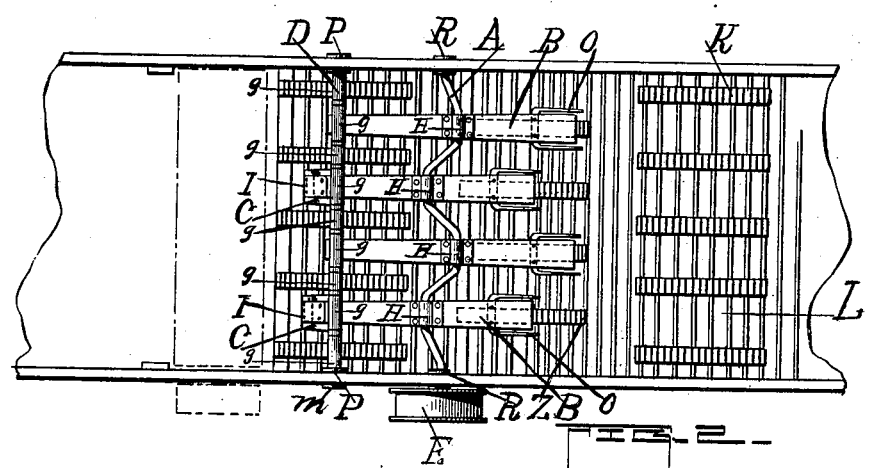
Witnesses:
Chs. W. LaPorte
John S. Popple
Joseph Wilson
Inventor:
Mahlon B. Culbertson (deceased)
Administratrix:
Sarah F. Culbertson

UNITED STATES PATENT OFFICE.

SARAH F. CULBERTSON, OF DANVERS, ILLINOIS, ADMINISTRATRIX OF MAHLON B. CULBERTSON, DECEASED.

GRAIN-SEPARATOR.

SPECIFICATION forming part of Letters Patent No. 651,300, dated June 5, 1900.

Application filed July 13, 1899. Serial No. 723,746. (No model.)

*To all whom it may concern:*

Be it known that MAHLON BISHOP CULBERTSON, deceased, late a citizen of the United States, residing at Danvers, in the county of McLean and State of Illinois, did invent a new and useful Improvement in Tedder Mechanism for Threshing-Machines, of which the following is a specification.

This invention relates to mechanism for use in combination with the shaker mechanism of threshing-machines for the perfect separation of the grain from the straw and chaff.

The primary object of the invention is to provide efficient means for preventing grain from being carried through the machine with the straw and being thereby lost. This object is accomplished by the use, in combination with the shaker mechanism of a threshing-machine, of some suitable form of tedder mechanism, preferably that herein shown and described, which serves to lift the somewhat-compacted mass of straw, chaff, and entrapped grain bodily from off and between the shaker-fingers and thoroughly separate it, thereby dislodging the grain, which drops to the floor of the shaker, to be thereafter advanced to the sieves, and then to toss the loosened disconnected mass forward to an advanced position on its course over the shakers.

In the accompanying drawings, which represent the preferred form of tedder mechanism applied to a threshing-machine of well-understood construction, in part conventionally shown, Figure 1 is a broken longitudinal vertical section through the machine and tedder mechanism. Fig. 2 shows an enlarged broken plan section of the new apparatus at line L of Fig. 1, the quadruple crank-shaft of the tedder mechanism being shown in a different position to its position in Fig. 1. Fig. 3 is a detail cross-section of a stirrup on the shaft with one of the intermediate collars.

A represents a quadruple crank-shaft rotatably supported in journal-bearings R, fixed to the sides of the separator. The flange-pulley E is employed for rotating the crank-shaft A, or, if desired, a sprocket-wheel or other suitable means may be employed for that purpose. To the cranks of the shaft A are journaled fork-carrying bars or arms B at or near their centers by means of boxes H and linked at their front ends (which are narrow) to the stirrups C (which are narrow at that end) by means of journal-boxes I, and the open wider ends of stirrups C depend from shaft D, the whole being swingingly supported on shaft D. A removable cap $m$ is shown providing for the end thrust of shaft D and allowing insertion and removal of shaft D. On shaft D spacing-collars $g$ separate the stirrups C from each other and form the sockets F.

The fork-carrying bars or arms B are each equipped near their rear wider ends with at least two tines or forks preferably, or, if desired, one tine would suffice or more than two tines. Said tines or forks O are so arranged as to form an angle with the bars or arms B, and the bars or arms B are graded off to an edge in thickness, beginning where the forks or tines are fastened to the arms by bolts or other suitable fastening.

Fig. 3 shows a stirrup with the upper open end wider than the lower end, which is closed by a pivot. The cross piece or brace $n$ is nearer the open end than the closed end. This is the preferred form. The stirrups could, however, be made of common form, and the fork-carrying bars or arms B are preferably wider at the rear end; but they also could be made of common form.

The accompanying drawings show four fork-carrying bars or arms B, each equipped with two tines or forks O, and the said fork-carrying bars or arms are arranged to move in pairs, the members whereof are arranged in alternation, as shown. Any number of the above could be used.

The apparatus shown in Fig. 1 is placed in position immediately above the row of shaker-fingers, back of the check-board S, and when in operation the steel forks O are so located as to receive a shaker-finger Z between them. When the rear end of the arms or bars B, to which they are attached, is in its lowermost position, they (the tines or forks O) swing free of the open-work-bottom straw-support L, while the bars or arms B do not touch the shaker. The angles formed by the tines O with the arms B serve as guards to prevent the straw from slipping over the bars.

The accompanying drawings show four stirrups.

When in operation, one alternate pair of arms B are at one time horizontal with the machine, and at this moment of time the other alternating pair of arms B are describing a downward rearward movement.

The action of this invention is to pick up the straw in small forkfuls and toss it upwardly and rearwardly. In light grain, such as oats, particularly when the straw is heavy, green, or damp, the straw becomes massed together so closely under the action of the shaker as to prevent the grain from being disentangled therefrom. This simple device will pick up as little as five straws or as much as a forkful.

The machine can be run at full speed after the introduction of this device, and it effectually dislodges all grain retained in the straw and saves every single grain. More than one tedder can be used.

What is claimed as new is—

In a threshing-machine, the combination with oscillating shaker mechanism provided with a straw-support having longitudinal shaker-fingers, of tedder mechanism comprising a multiple crank-shaft, bars operatively connected therewith, means for rotating said shaft, and tines on each of said bars near and forming an angle with the rear end thereof, the tines of each bar flanking a shaker-finger, and slightly clearing the bottom of said straw-support, in the rearward movement of the bar, and being raised clear thereof in the reverse movement of the bar, substantially as, and for the purpose set forth.

June 23, 1899.

SARAH F. CULBERTSON,
*Administratrix of the estate of Mahlon B. Culbertson, deceased.*

Witnesses:
JOSEPH WILSON,
JOHN S. POPPLE.